United States Patent [19]
Olofsson

[11] Patent Number: 6,006,689
[45] Date of Patent: Dec. 28, 1999

[54] ARRANGEMENT FOR DYNAMIC CONTROL OF RUNNING TRIM AND LIST OF A BOAT

[75] Inventor: Bo Olofsson, Lidköping, Sweden

[73] Assignee: Profjord AB, Lidkoping, Sweden

[21] Appl. No.: 09/066,813

[22] Filed: Apr. 28, 1998

[51] Int. Cl.[6] .................................................. B63B 1/22
[52] U.S. Cl. ............................................................ 114/285
[58] Field of Search .................................... 114/271, 285, 114/284, 286, 287

[56] References Cited

U.S. PATENT DOCUMENTS

| | | | |
|---|---|---|---|
| 3,327,671 | 6/1967 | Comins | 114/285 |
| 5,628,272 | 5/1997 | Thomas | 114/285 |
| 5,881,666 | 3/1999 | Crews, Jr. | 114/285 |

FOREIGN PATENT DOCUMENTS 502 671  12/1985  Sweden .

*Primary Examiner*—Stephen Avila
*Attorney, Agent, or Firm*—Burns, Doane, Swecker & Mathis, L.L.P.

[57] ABSTRACT

The invention pertains to an arrangement for dynamic control of running trim and list of a boat, having at least one hull with a stern. The arrangement (100) has a housing member (102), an interceptor member (103, 103'), an actuator (105) and a power supply (106). The actuator (105) is arranged for displacing the interceptor member (103, 103') in a continuous linear movement between first (103) and second end positions (103') or vice versa in relation to said housing member (102), which comprises an attachment (104, 104', 104", 104''') for attachment to the hull. The interceptor member (103, 103') has a first portion (107) and a second (108) portion, wherein the first portion (107) extends essentially perpendicularly from the middle of the entire length of the second portion (108). The housing member (102) partially encloses the first portion (107) so that the housing member (102) firmly guides the first portion (107) during the linear movement. The housing member (105) further defines an internal space, inside of which the actuator (105) is accommodated (102). The present invention is applicable for dynamic control of running trim and list of boats, in particular for planing or semi-planing boats. However, the invention is also applicable for larger vessels.

12 Claims, 6 Drawing Sheets

B-B

B'-B'

A-A

C-C

D-D

A"-A"

ARRANGEMENT FOR DYNAMIC CONTROL OF RUNNING TRIM AND LIST OF A BOAT

TECHNICAL FIELD

The present invention pertains to an arrangement for dynamic control of running trim and list of a boat having at least one hull with a stern. The arrangement has a housing member and an interceptor member, which is linearly displaceable in relation to the housing member, wherein the housing member has attachment means for attaching the arrangement to the hull of the boat. The present invention is applicable for dynamic control of running trim and list of boats, in particular for planing or semi-planing boats. However, the invention is also applicable for larger vessels.

BACKGROUND OF THE INVENTION

A number of different devices and arrangements intended for dynamic control of running trim of boats are previously known.

One such previously known arrangement comprises the use of a so-called interceptor member, constituted of a plate or interceptor member arranged transverse to the vessel bottom and attached thereto. Such an interceptor member increases the water pressure acting on the bottom of the hull in front of the interceptor member and, accordingly, changes the running trim of the boat or vessel.

Furthermore, the patent publication SE-C2-502 671 discloses a device for dynamic trimming of a planing or semi-planing vessel hull. The disclosed device comprises a trim plate, directly behind the hull bottom in the path direction, which has been inserted into the relative water flow and crossways to it. The trim plate produces at least one main vortex with an upwardly and forwardly directed force component in front of the trim plate. According to SE-C2-502671, this causes the formation of a water volume with an increased pressure acting against a zone of the hull bottom in front of the trim plate. The trim plate is preferably inserted to a continuously adjustable depth, corresponding to 0–3% of the trim plate length and preferably at the most corresponding to 2.7% of its length. Furthermore, the trim plate preferably extends along an essential portion of the hull width and preferably along the whole width of the hull bottom or bottom halves.

According to SE-C2-502 671, the disclosed device provides a number of advantages such as rapid response, low power consumption, high utilization of the supplied trimming energy, low mechanical stress on the movable parts, and no disturbance of a reversing water jet.

Something which might be perceived as a problem with the previously known arrangements for dynamic control of running trim of a boat is that they usually are supplied in the form of a number of separate parts and/or units.

Accordingly, previously known arrangements might comprise an interceptor member provided with elongated apertures which are slidably mounted on the boat hull, e.g. by means of guide pins which are fixedly attached to the hull. Such a previously known arrangement also comprises a separate actuating means, for displacing the interceptor member to the desired position in relation to the hull. In such a case, also the actuating means has to be fixedly attached to the hull of the boat by means of separate attachment means, something which of course might result in undesired damage to the hull surface and/or the hull structure.

Furthermore, in order to achieve sufficient stability and power for linear displacement of the interceptor member, the previously known arrangements normally require the use of several actuating means acting on the interceptor member.

SUMMARY OF THE INVENTION

Accordingly, the object of the present invention is to provide an arrangement for dynamic control of running trim and list of a boat, which arrangement overcomes the above-mentioned problems with the previously known arrangements, and provides a compact, stable and reliable unit, which easily can be installed on the hull or hulls of a boat with a minimum of damage to the hull or hulls.

This object is achieved, in accordance with claim 1, by means of an arrangement having a housing member and an interceptor member, wherein the arrangement further has an actuating means and a power supply means. The actuating means is arranged for displacing the interceptor member in a continuous linear movement between first and second end positions or vice versa in relation to the housing member. According to the invention, the housing member comprises attachment means for attaching the arrangement to the hull. The interceptor member has a first portion and a second portion, wherein the first portion extends essentially perpendicularly from the middle of the entire length of the second portion. Thereby, the housing member partially encloses the first portion so that the housing member firmly guides the first portion during the linear movement.

The housing member further defines an internal space inside of which the actuating means is accommodated.

BRIEF DESCRIPTION OF THE DRAWINGS

In the following, the invention will be described in greater detail with reference to the attached drawings, wherein.

DETAILED DESCRIPTION OF PREFERRED EMBODIMENT

Figure 1:
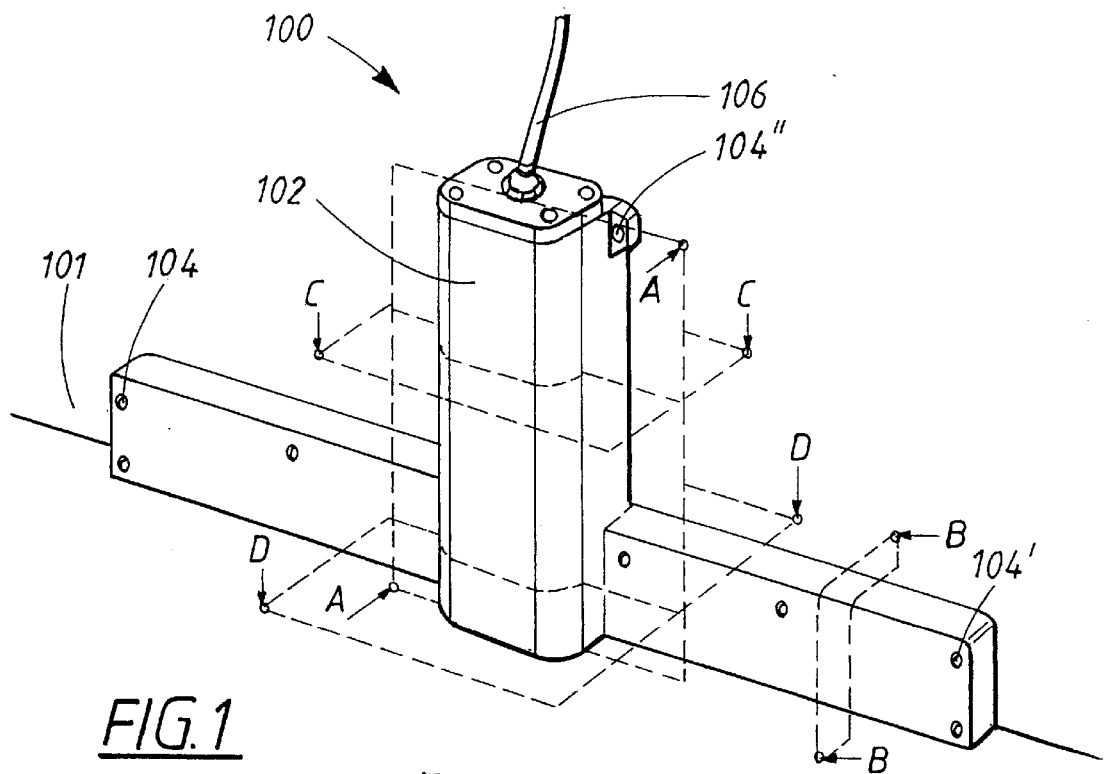
FIG. 1 shows a perspective view of an arrangement according to the invention, viewed when attached to the stern of a boat.

In the following, an arrangement according to the invention will be described with reference to FIGS. 1–9. Furthermore, a preferred embodiment and several advantageous and alternative embodiments will be disclosed.

The arrangement 100 according to the invention is intended for dynamic control of running trim and list of a boat, wherein the boat has at least one hull with a stern 101. Accordingly, the arrangement according to the invention can be utilized both for single hull boats and for boats or vessels with several hulls.

The arrangement 100 according to the invention has a housing member 102 and an interceptor member 103, 103'.

In the preferred embodiment, both the housing member 102 and the interceptor member 103, 103' are made of fibrere-inforced polyacetal resin. In this embodiment, the interceptor member 103, 103' is constituted of a single component of fibre-reinforced polyacetal resin, whereas the housing member 102 is constituted of a generally T-shaped component and a cover which has been firmly attached to one of the legs of the generally T-shaped component.

However, embodiments wherein the housing member 102 and/or the interceptor member 103, 103' are made of other non-reinforced or reinforced plastic or composite materials, or embodiments wherein the housing member 102 and/or the interceptor member 103, 103' are made of metal, e.g. stainless steel, aluminium, rubber or another suitable material are also conceivable. Furthermore, embodiments of the invention are also conceivable in which the housing member and/or the interceptor member is/are constituted of more components than what is shown in the attached drawings, wherein several components have been assembled together into the desired shapes.

The arrangement 100 according to the invention further includes an actuating means 105 and a power supply means 106. The actuating means 105 is arranged for displacing the interceptor member 103, 103' in a continuous linear movement between first 103 and second 103' end positions or vice versa in relation to the housing member 102.

According to the invention, the housing member 102 comprises attachment means 104, 104', 104", 104''' for attaching the arrangement 100 to the hull of the boat. Furthermore, the interceptor member 103, 103' has a first portion 107 and a second portion 107, 108. The first portion 107 extends essentially perpendicularly from the middle of the entire length of the second portion 108, i.e. the interceptor member 103, 103' has a T-shape. The housing member 102 partially encloses the first portion 107, so that the housing member 102 firmly guides the first portion 107 during the linear movement of the interceptor member. As is most clearly evident from FIGS. 2, 6 and 7, external surfaces of the first portion 107 are guided by partially enclosing portions of the housing member 102. Thereby, the T-shape of the interceptor member 103, 103' makes it possible to obtain a stable guiding effect on the first portion 107, during the linear movement of the interceptor member 103, 103'. Embodiments of the invention, wherein the housing member 102 encloses more or less of the first portion 107 than what is shown in the attached drawings, are also conceivable.

Furthermore, according to the invention, the housing member 102 defines an internal space, inside of which the actuating means 105 is accommodated. Thereby, many different designs of the housing member 102 are conceivable.

In the preferred embodiment, both the interceptor members 103, 103' and the housing member 102 have a T-shape. However, it is also conceivable to have embodiments wherein only the interceptor member has a defined T-shape, or wherein the interceptor member has a T-shape which is different from the T-shape of the housing member.

Figure 2:
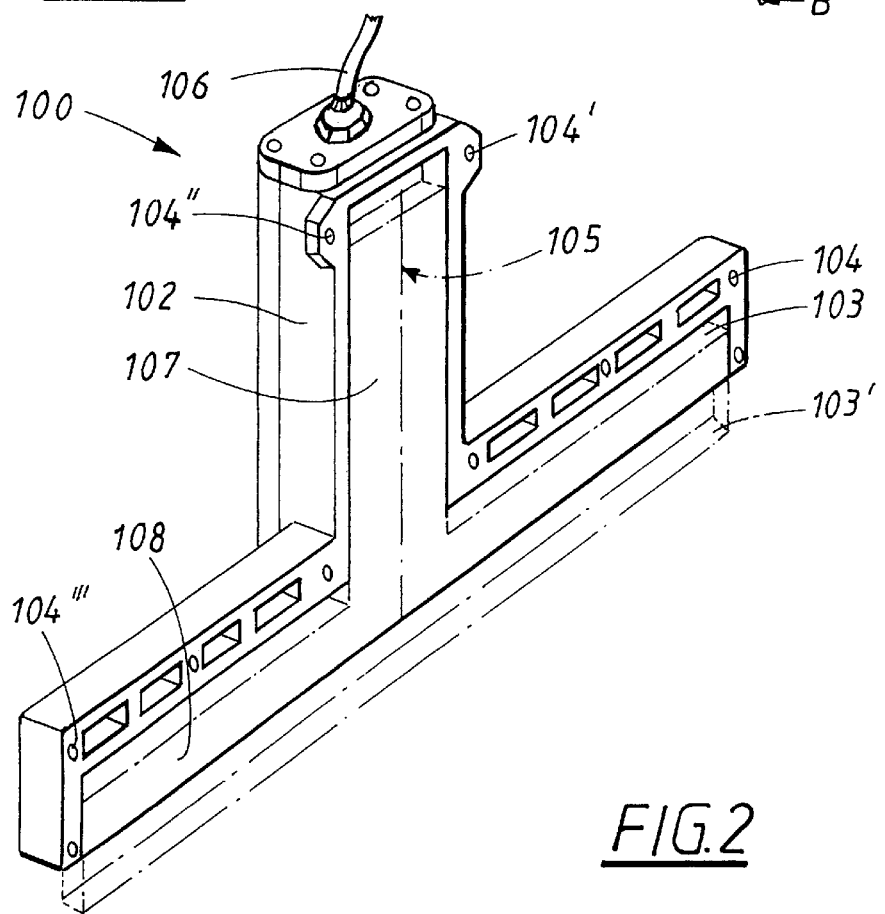
FIG. 2 shows another perspective view of the arrangement shown in FIG. 1, when the arrangement has been detached from the stern of the boat.
Figure 3:
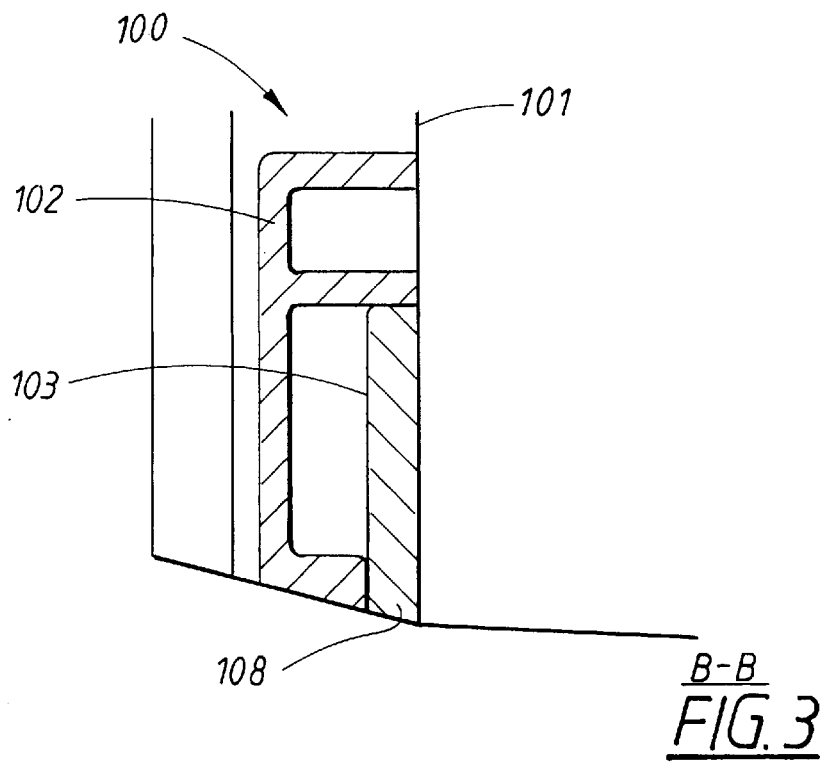
FIG. 3 shows a view through the section B—B in FIG. 1, with the arrangement in a non-activated condition.
Figure 4:
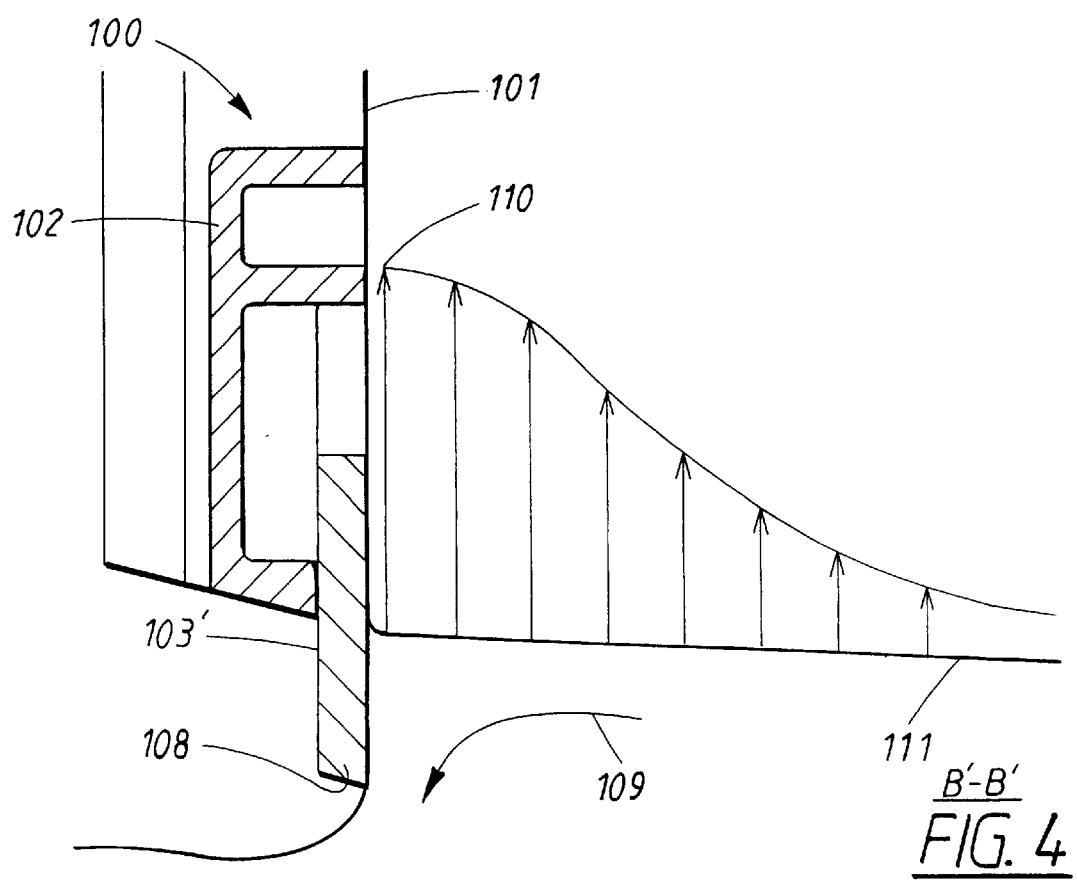
FIG. 4 shows a view through the section B—B in FIG. 1, but with the arrangement in an activated condition.

In the preferred embodiment, as shown in FIGS. 1 and 2, the attachment means 104, 104''' are constituted of a number of pre-drilled through-holes in the horizontal portion of the T-shaped housing member 102, and of protruding tabs 104', 104", also having pre-drilled holes, attached to upper corners of the vertical portion of the, in the preferred embodiment, T-shaped housing member 102.

Using the pre-drilled holes, the housing member 102 can be fixedly attached to the stern 101 of the boat by means of, for example screws. The attachment means 104, 104', 104", 104''', with their pre-drilled holes, are arranged in a predetermined pattern which is designed in order to provide sufficient attachment stability when the arrangement is mounted onto the hull. However, embodiments of the invention with other types and configurations of attachment means than those shown in the attached drawings are also conceivable.

Figure 5:
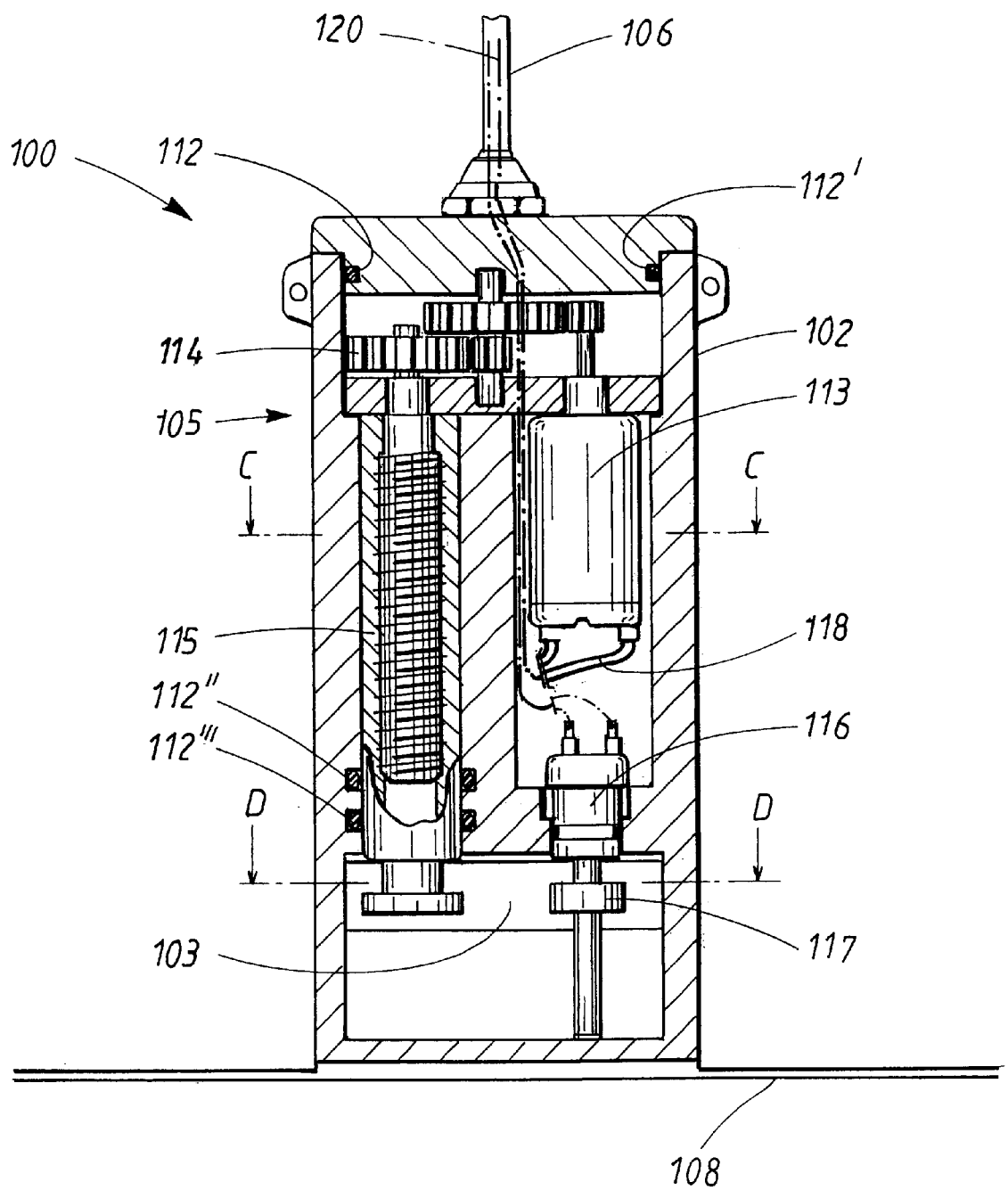
FIG. 5 shows a view through the section A—A in FIG. 1.
Figure 6:
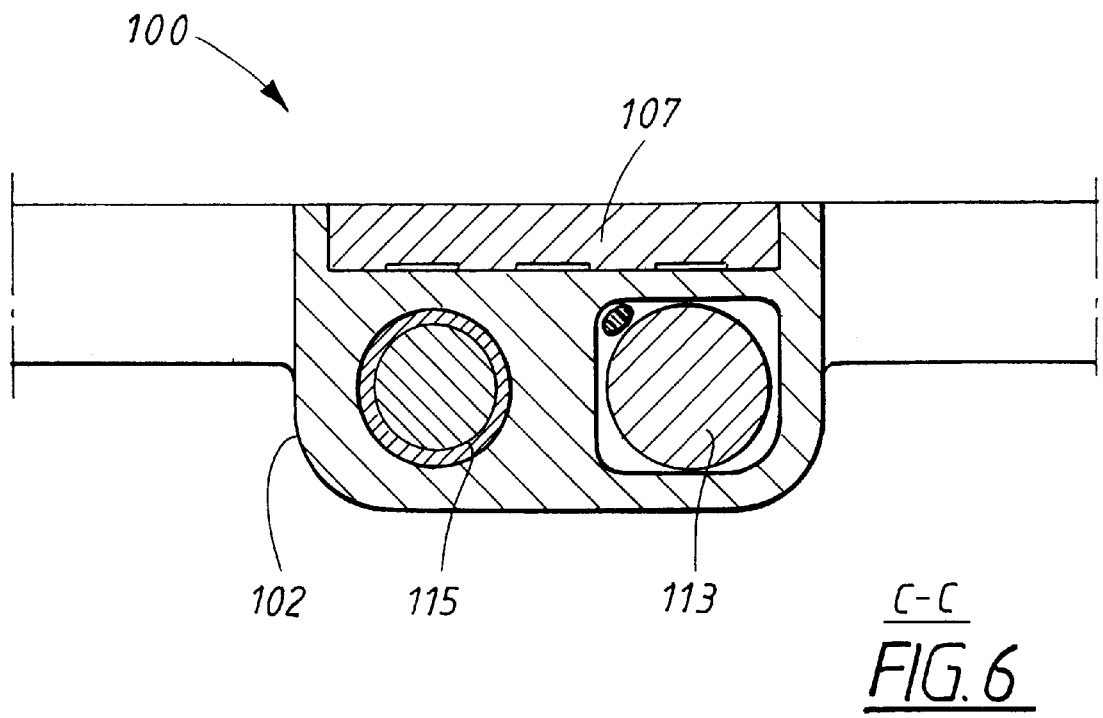
FIG. 6 shows a view through the section C—C in FIG. 1.

According to the preferred embodiment of the invention, the arrangement further includes sealing means 112, 112', 112", 112'''. In the preferred embodiment, as is best shown in FIG. 5, a number of the sealing means 112, 122' are in sealing contact with different parts which constitute the housing member 102, while other sealing means 112", 112''' are in sealing contact with both the housing member 102 and the actuating means 105, in order to se al the in ternal space defined by the housing member 102 against water. In the preferred embodiment, the sealing means 112, 112', 112', 112" are constituted of so-called O-rings of rubber, but many other types of sealings and sealing configurations are conceivable.

The T-shape of the interceptor member 103, 103', and in the preferred embodiment also of the housing member 102, provides several important advantages. Firstly, a T-shaped housing member 102 makes it possible to obtain high is attachment stability with a low material consumption. Secondly, a T-shaped interceptor member 103, 103' together with a T-shaped housing member 102 form a compact, waterresistant unit 100 with low weight. Thus, the arrangement according to the invention can easily be mounted on the hull of a boat, after which the power su pply means 106 is connected to a suitable power source, and the arrangement 100 is ready for use.

In an advantageous embodiment of the arrangement according to the invention, the first portion 107 of th e interceptor member 103, 103' is intended to be substantially vertical and the second portion 108 is intended to be substantially horizontal to the plane of a water surface when the arrangement 100 is attached to the hull. When the boat is running across a surface of the water volume 109 and the arrangement 100 is attached to the hull, as is evident from FIG. 4, the second portion 108 is designed for providing the water volume 109 with an increased pressure 110 acting on a region 111 of the hull in front of the stern 101 when the interceptor member 103, 103' is in the second end position 103' or in a position between the first 103 and second 103' end positions. As is most clearly evident from FIGS. 3 and 4, the housing member 102 is thereby designed for absorbing the forces created by the increased pressure 110 and acting on the second portion 108. In this embodiment, the housing member 102 is further designed for distributing and transferring the absorbed forces to the hull when the arrangement 100 is attached to the hull.

In this embodiment, the desired effect of force absorption, transfer and distribution is achieved, for example, by giving the cross-section of the housing member 102 an E-shape, wherein the lower leg of the E-shape absorbs a large portion of the forces acting on the second portion 108 of the interceptor member 103' when it is in an activated position, i.e. not in its first position 103. The middle and the upper leg of the E-shape distribute and transfer the absorbed forces to the hull of the boat. However, embodiments with other designs providing the same effect are also conceivable.

In another advantageous embodiment, and with particular reference to FIG. 5, the actuating means 105 comprises an electrical motor 113, a gear unit 114 and a transmission member 115. The electrical motor 113 is arranged for providing a rotational movement which via the gear unit 114 is transferred to the transmission member 115, which is arranged for transforming the rotational movement into a linear movement which is transferred to the interceptor member 103, 103'. However, many other embodiments of the transmission member 115 are conceivable. In the described embodiment, the transmission member 115 is constituted of a screw with external threads, engaging with internal threads of a substantially cylindrical recess inside a cover member of the transmission member 115. In the described embodiment, the s crew is carried in bearings of the housing member 102, while the cover member is attached to the second portion 108 of the interceptor member 103, 103', something which is evident from FIG. 7. In this embodiment, the power supply means 106 is constituted of an electrical power supply of a conventional type for marine applications.

Figure 8:
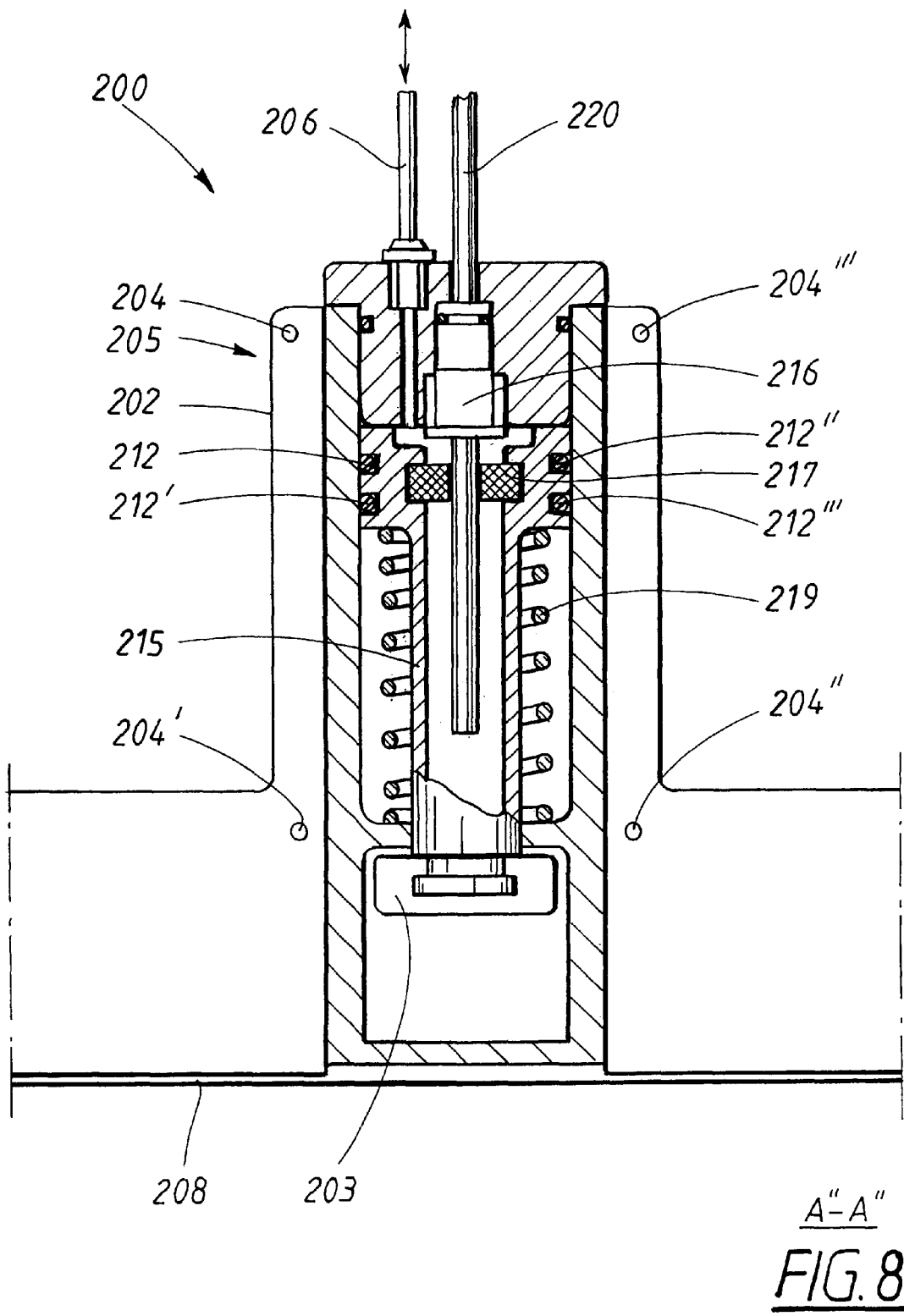
FIG. 8 shows a corresponding view as in FIG. 5 but of an arrangement according to an alternative emodiment of the invention.

As is evident from FIG. 8, it is also conceivable to have embodiments of the invention, wherein the actuating means 205 comprises a hydraulic device with a spring means 219 and a transmission member 215, i.e. a piston. In such an embodiment, the hydraulic device is arranged for providing a movement which is transferred to the transmission member 215, wherein the transmission member 215 is arranged for transferring the movement to the interceptor member 203 in order to linearly displace the interceptor member 203 towards the second end position. Furthermore, the spring means 219 are arranged for linearly displacing the interceptor member 203 towards the first end position, i.e. in the opposite direction. In such an embodiment, the power supply means 206 is a hydraulic power supply.

Embodiments of the invention are also conceivable in which the actuating means comprises a hydraulic device, but no spring means (not shown in the drawings). In such an embodiment, the hydraulic device is arranged for linearly displacing the interceptor member both to and in a direction from the second end position.

Furthermore, embodiments of the invention are also conceivable, wherein the actuating means comprises a crank means, a gear unit and a transmission member (not shown in the drawings). Thereby, the crank means is arranged for providing a movement which, via the gear unit, is transferred to the transmission member, which is arranged for transferring the movement to the interceptor member. In such an embodiment, the power supply means is a manual power supply, i.e. the crank means are operated by hand by the boat crew. Such an embodiment of the arrangement according to the invention is particularly suitable for smaller boats.

Figure 7:
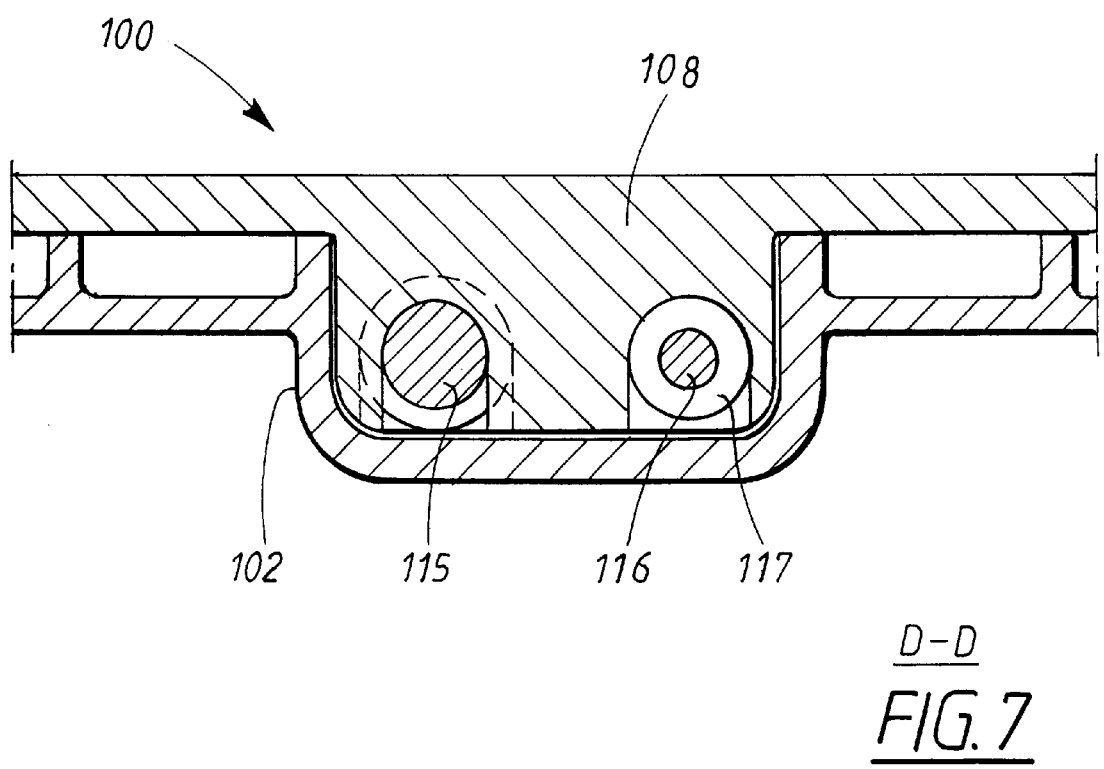
FIG. 7 shows a view through the section D—D in FIG. 1.

In advantageous embodiments of the invention, as is evident from FIGS. 5, 7 and 8, the arrangement 100; 200 further comprises a position transducer 116; 216, which is arranged inside the internal space defined by the housing member 102; 202, for detecting the position of the interceptor member 103; 203 and for transmitting a signal to an indicating unit (not shown) on board the boat via a transmission line 120; 220. Thereby, the transmitted signal corresponds to the position of the interceptor member 103; 203. In the embodiments shown in the drawings, the position transducer 116; 216 is of an inductive type and includes an annular magnet 117; 217 in a manner known per se. However, embodiments with other designs of the position transducer 116; 216 are also conceivable, e.g. transducers of a resistive type.

In one advantageous embodiment of the invention, the arrangement 100 is attached to a substantially vertical surface of the stern 101 of the boat, wherein the entire length of the second portion 108 of the interceptor member extends along a limited portion of the horizontal width of the surface of the stern 101.

In another advantageous embodiment of the invention, the arrangement is attached to a substantially vertical surface of the hull in front of the stern, wherein the entire length of the second portion of the interceptor member extends along a limited portion of the horizontal width of the surface of the hull in front of the stern. Such an embodiment can advantageously be used when, for some reason, attachment of the arrangement to the stern of the boat is impossible or difficult, e.g. when the stern is sloping or comprises surfaces at an angle to the longitudinal axis of the boat.

However, embodiments of the invention are also conceivable wherein the arrangement is attached to a surface of the boat hull which forms an angle to the water surface upon which the boat floats.

Embodiments of the present invention are also conceivable, wherein the arrangement comprises more than one housing member, interceptor member, actuating means, and power supply means, which all are attached to the hull of the boat. Such embodiments provide more possibilities, where the dynamic control of the running trim and list of a boat is concerned, and may also be utilized for changing the travelling direction of a running boat or vessel.

Furthermore, there are advantageous embodiments of the invention, wherein the boat is provided with more than one hull, e.g. catamarans. In such embodiments, one or several complete arrangements according to the invention are attached to one or several of the hulls of the boat, i.e. the number of housing members, interceptor members and actuating members is identical and, accordingly, corresponds to the number of arrangements according to the invention which is utilized.

Figure 9:
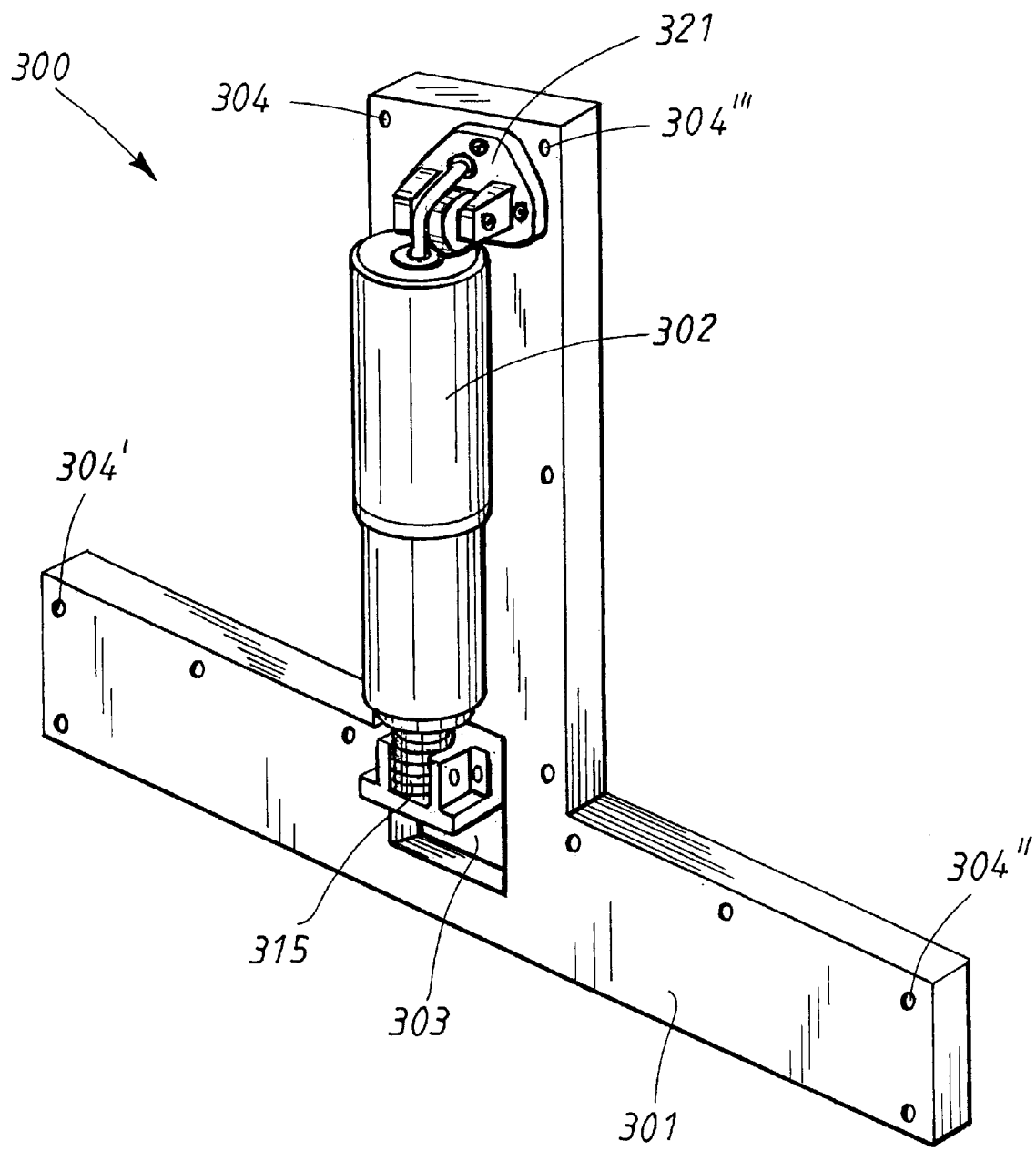
FIG. 9 shows a perspective view of a further alternative embodiment of the arrangement according to the invention.

In FIG. 9, an alternative embodiment of the arrangement 300 according to the invention is shown. In this embodiment, the housing member 302, 302' comprises a generally cylindrical first member 302, which accommodates the actuating means (not visible in the drawing), and a T-shaped second member 302', which is attached 321 to the first member 302 and provides the desired guiding effect on the first portion (not visible in the drawing) of the interceptor member 303. Furthermore, the T-shaped second member 302' of the housing member 302, 302' provides attachment means 304, 304', 304", 304'" for attachment of the arrangement 300 to the hull of a boat. In this embodiment, a transmission member 315, which is actuated by the actuating means, protrudes from the first member 302 and is attached to the interceptor member 303.

The present invention is not limited to the embodiments described above and shown in the attached drawings, but can of course be varied within the scope of the following claims.

For example, when the invention is utilized primarily for dynamic control of running trim of a boat, one single arrangement according to the invention or several cooperating arrangements according to the invention can be used. In this case the arrangement or the cooperating arrangements is/are activated to the degree necessary in order achieve the desired running trim of the boat, e.g. in order to avoid that the bow of the running boat rises too high.

When the invention instead is utilized primarily for dynamic control of list of a boat, a pair of arrangements according to the invention are suitably used. Thereby, one of the arrangements according to the invention is attached close to the starboard end of the stern, while the other arrangement is attached closer to the port end of the stern. In this case, the pair of arrangements according to the invention are activated in an individual manner, i.e. the arrangement at the end of the stern of the running boat which is closer to the water surface is activated to a higher degree than the arrangement attached to the opposite end of the stern. However, embodiments of the invention are also conceivable wherein more than two arrangements according to the invention are utilized for the above-described control strategy.

If the two above-described strategies are combined, dynamic control of both running trim and list of a running boat can be achieved by means of the invention.

Furthermore, the arrangement or arrangements according to the invention can be connected to a suitable control system of any previously known type, e.g. a computerized control system on board a boat or vessel.

I claim:

1. An arrangement for dynamic control of running trim and list of a boat, said boat having at least one hull with a stern, said arrangement having a housing member and an interceptor member, said arrangement further having an actuating means and a power supply means, said actuating means being arranged for displacing said interceptor member in a continuous linear movement between first and second end positions or vice versa in relation to said housing member, which comprises attachment means for attaching said arrangement to said hull, said interceptor member having a first portion and a second portion, wherein said first portion extends essentially perpendicularly from the middle of the entire length of said second portion, wherein said housing member partially encloses said first portion so that said housing member firmly guides said first portion during said linear movement, and wherein said housing member further defines a water tight internal space, inside of which said actuating means is accommodated.

2. An arrangement according to claim 1, wherein said arrangement further comprises sealing means, said sealing means being in sealing contact with said housing member or in sealing contact with both said housing member and said actuating means in order to seal said internal space against water.

3. An arrangement according to claim 1, wherein said first portion is intended to be substantially vertical and said second portion is intended to be substantially horizontal to the plane of a water surface comprising a water volume when said arrangement is attached to said hull, said second portion being designed for providing said water volume with an increased pressure acting on a region of said hull in front of said stern when said interceptor member is in said second end position or in a position between said first and second end positions and when said boat is running across a surface of said water volume and said arrangement is attached to said hull, and wherein said housing member is designed for absorbing forces, created by said increased pressure, acting on said second portion, and for distributing and transferring said forces to said hull when said arrangement is attached to said hull.

4. An arrangement according to claim 1, wherein said actuating means comprises an electrical motor, a gear unit and a transmission member, wherein said electrical motor is arranged for providing a rotational movement which, via said gear unit, is transferred to said transmission member, which is arranged for transforming said rotational movement into a linear movement and for transferring said linear movement to said interceptor member, and wherein said power supply means is an electrical power supply.

5. An arrangement according to claim 1, wherein said actuating means comprises a hydraulic device with a spring means and a transmission member, said hydraulic device being arranged for providing a movement which is transferred to said transmission member, said transmission member being arranged for transferring said movement to said interceptor member in order to linearly displace said interceptor member towards said second end position, said spring means being arranged for linearly displacing said interceptor member towards said first end position, and wherein said power supply means is a hydraulic power supply.

6. An arrangement according to claim 1, wherein said actuating means comprises a hydraulic device with a transmission member, said hydraulic device being arranged for providing a movement which is transferred to said transmission member, said transmission member being arranged for transferring said movement to said interceptor member in order to linearly displace said interceptor member towards, or in a direction from, said second end position, and wherein said power supply means is a hydraulic power supply.

7. An arrangement according to claim 1, wherein said actuating means comprises a crank means, a gear unit and a transmission member, said crank means being arranged for providing a movement which, via said gear unit, is transferred to said transmission member which is arranged for transferring said movement to said interceptor member, and wherein said power supply means is a manual power supply.

8. An arrangement according to claim 1, wherein said arrangement further comprises a position transducer, said position transducer being arranged inside said internal space defined by said housing member for detecting said position of said interceptor member and for transmitting a signal to an indicating unit on board said boat via a transmission line, wherein said signal corresponds to said position of said interceptor member.

9. An arrangement according to claim 1, wherein said arrangement is attached to a substantially vertical surface of said stern, and the entire length of said second portion extends along a limited portion of the horizontal width of said surface of said stern.

10. An arrangement according to claim 1, wherein said arrangement is attached to a substantially vertical surface of said hull in front of said stern and the entire length of said second portion extends along a limited portion of the horizontal width of said surface of said hull in front of said stern.

11. An arrangement according to claim 1, wherein said housing member, said interceptor member, said actuating means, and said power supply means, all are provided in a number being larger than one and are attached to said hull of said boat, wherein said number of housing members, interceptor members and actuating means is identical.

12. An arrangement according to claim 1, wherein said boat is provided with more than one hull, and said housing member, said interceptor member, said actuating means, and said power supply means, all are provided in a number being larger than one and are attached to one or several of said hulls of said boat, wherein said number of housing members, interceptor members and actuating means is identical.

* * * * *